United States Patent [19]
Harris et al.

[11] Patent Number: 5,337,674
[45] Date of Patent: Aug. 16, 1994

[54] PRINTED CIRCUIT BRIDGE FOR AN AIR BAG INFLATOR

[75] Inventors: Bradley D. Harris, Farmington; Virginia E. Chandler, Ogden, both of Utah

[73] Assignee: Morton International, Inc., Chicago, Ill.

[21] Appl. No.: 123,575

[22] Filed: Sep. 17, 1993

Related U.S. Application Data

[63] Continuation of Ser. No. 942,882, Sep. 11, 1992, abandoned.

[51] Int. Cl.$^5$ ............... C06D 5/00; F42B 3/12; F42C 19/12
[52] U.S. Cl. ............... 102/530; 102/202.7; 102/202.9; 280/741
[58] Field of Search ............... 102/202.1, 202.2, 202.5, 102/202.7, 202.9, 202.11, 202.14, 530, 531; 280/735, 741; 422/166

[56] References Cited

U.S. PATENT DOCUMENTS

| | | | |
|---|---|---|---|
| 3,572,247 | 3/1971 | Warshall | 102/28 |
| 4,306,499 | 12/1981 | Holmes | 102/202 |
| 4,311,749 | 1/1982 | Hiraiwa et al. | 428/209 |
| 4,350,096 | 9/1982 | Cannavo et al. | 102/202.5 |
| 4,465,538 | 8/1984 | Schmoock | 156/233 |
| 4,541,035 | 9/1985 | Carlson et al. | 174/257 |
| 4,600,123 | 7/1986 | Galbraith | 102/530 |
| 4,730,558 | 3/1988 | Florin et al. | 102/202.7 |
| 4,745,858 | 5/1988 | Harder | 102/202.5 |
| 4,864,184 | 9/1989 | Fleming | 313/318 |
| 4,943,086 | 7/1990 | Cunningham | 280/741 |
| 5,131,679 | 7/1992 | Novak et al. | 280/741 |
| 5,146,044 | 9/1992 | Kurakawa et al. | 102/202.5 |

FOREIGN PATENT DOCUMENTS

| | | | |
|---|---|---|---|
| 581316 | 8/1959 | Canada | 102/202.5 |
| 3537821 | 4/1987 | Fed. Rep. of Germany | 102/202.5 |
| 2412051 | 8/1979 | France | 102/202.5 |
| 2213322 | 8/1989 | United Kingdom | 102/202.5 |

OTHER PUBLICATIONS

The Condensed Chemical Dictionary Sixth Edition by Rose et al., Reinhold Publishing Corporation, 1961, p. 445.

*Primary Examiner*—Harold J. Tudor
*Attorney, Agent, or Firm*—Gerald K. White

[57] ABSTRACT

A metal bridge initiator, with or without a spark gap feature, for firing an air bag inflator is deposited on a thin plastic film substrate. The bridge can be tuned by adjusting the width and thickness of the substrate. The bridge is of compact size enabling an increase in the strength of the inflator in the initiator area thereof. If there is an initiator structural failure, the very small feed through slot into the interior of the inflator will plug up with the products of combustion of the inflator. The intimate contact between the deposited metal bridge and plastic substrate makes the initiator resistant to vibration, bending and damage. The method of manufacturing is simpler than for conventional inflator initiators and is adapted to mass production.

17 Claims, 2 Drawing Sheets

FIG. 3
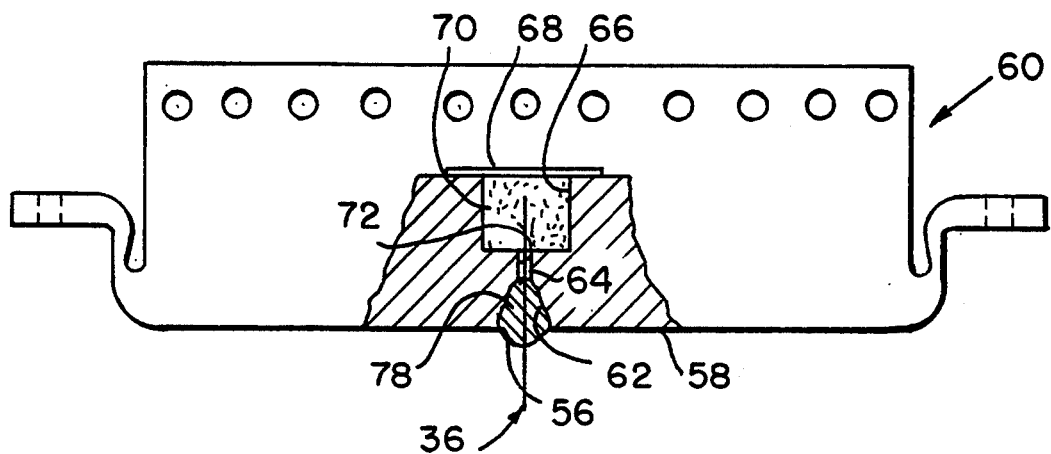
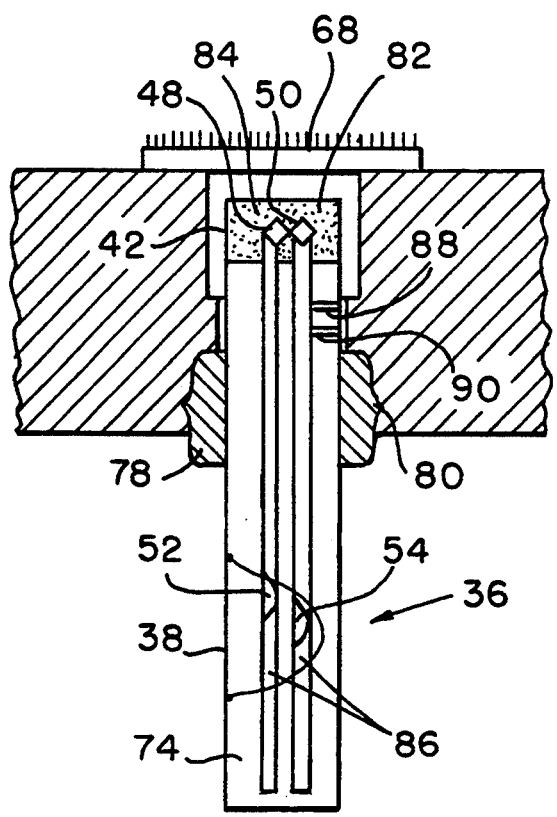
FIG. 4

5,337,674

PRINTED CIRCUIT BRIDGE FOR AN AIR BAG INFLATOR

This is a continuation of co-pending application Ser. No. 07/942,882 filed on Sep. 11, 1992, now abandoned.

BACKGROUND OF THE INVENTION

1. Field of the Invention

This invention relates to electrically initiable squibs or initiators for firing inflators for safety air bags in automotive vehicles.

2. Description of the Prior Art

A typical initiator for firing inflators for safety air bags in automotive vehicles has a fine gauge bridge embedded in a pyrotechnic material that ignites or fires when brought to a sufficiently high temperature. Such initiators are disclosed in U.S. Pat. No. 3,572,247 to T. Warshall and in U.S. Pat. No. 4,306,499 to W.W. Holmes, the latter patent being assigned to the assignee of the present invention. Heating of the bridge is effected by passing therethrough a direct electrical current. The energy required to attain the firing temperature is very small.

There is a need and a demand for an improved initiator for an air bag inflator. The present invention was devised to satisfy such need and demand.

SUMMARY OF THE INVENTION

An object of the invention is to provide an improved initiator for an air bag inflator that may be fabricated by simpler methods of manufacture and is more adapted to being mass produced.

Another object of the invention is to provide such an improved initiator comprising an electrically conductive bridge that is deposited on an elongated nonconductive thin film plastic plate or substrate.

A further object of the invention is to provide such an improved initiator wherein the deposited electrically conductive bridge is in intimate contact with the film whereby the initiator is especially resistant to damage tending to be caused by vibration, bending and handling.

Still another object of the invention is to provide such an improved initiator in which the bridge can be tuned by adjusting the width and/or thickness of the substrate, and the shape of the bridge segments.

Another object of the invention is to provide an inflator for an air bag comprising a housing having a base component with a slot formed therein into the interior of said inflator, said slot having opposed walls, a printed circuit bridge initiator for said inflator, a portion at least of said initiator being insertable into the interior of said inflator through said slot and comprising, an elongated thin film electrically nonconducting plastic substrate, and a printed circuit bridge formed on said substrate comprising spaced electrically conducting strips extending for substantially the full length of the substrate, said strips being adapted for the connection thereto at a first end thereof of a source of direct electrical current and having a bridge connected therebetween at a second end thereof, said bridge forming part of the portion of said printed circuit bridge that is inserted into the interior of said inflator through said slot.

A still further object of the invention is to provide an initiator for an air bag inflator that requires only a very small feed through slot into the interior of the inflator whereby if there is a structural initiator failure, the slot will be plugged with the larger products of combustion produced in the inflator, thereby minimizing the emission, if any, of the inflator combustion gases through the slot.

In accomplishing these and other objectives of the invention, there is provided a printed circuit bridge initiator for an air bag inflator including a thin base plate or substrate made of insulating or electrically nonconducting material such as polyamide. The printed circuit may be deposited on the substrate using conventional printed circuit techniques and may be made of metal such as copper, aluminum, tungsten and platinum. Additionally, in accordance with the invention, the printed circuit bridge may be made with, or without, a printed protrusion providing a spark initiation site to protect the initiator against the effects of electrostatic discharge. Also, the printed circuit bridge may incorporate in physical association with the bridge a printed or painted on explosive charge thereon, or such charge may be omitted, if desired.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawings which form part of the specification, in which like parts are designated by the same reference numbers, and of which:

FIG. 3 is a fragmented side view, partly in cross section, illustrating a printed circuit bridge shown in FIG. 2 extending through a slot in the base of an inflator into a cavity therein comprising the ignition chamber and containing pyrotechnic material;

FIG. 4 is a fragmented front view, partly in section, of the invention embodiment shown in FIG. 3.

DESCRIPTION OF THE PREFERRED EMBODIMENTS

As used herein, the term "tuneability" means adjustment of the relationship between the magnitude of the direct electrical current flow through the initiator and the duration (time) of such current flow required to activate the initiator.

Figure 1:
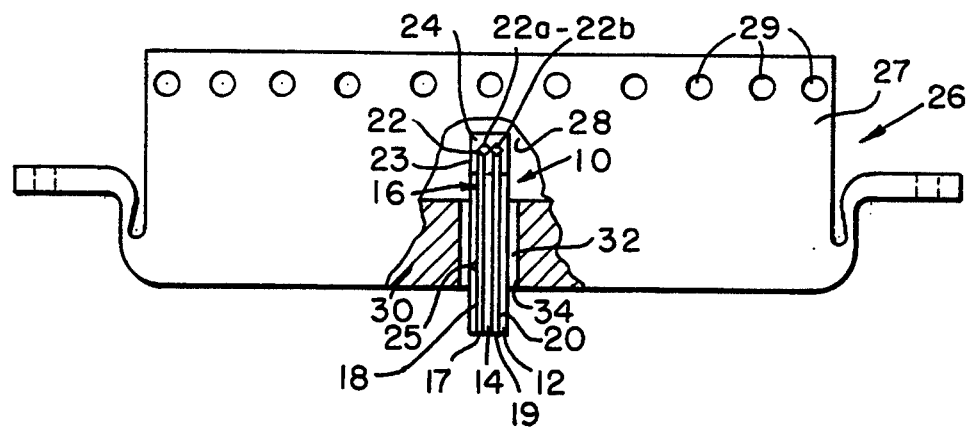
FIG. 1 is a front view, partly in cross section, showing the printed circuit bridge for an air bag initiator, according to one embodiment of the invention extending into the interior of an inflator through a slot in the base component thereof.

Referring to the drawings, there is shown in FIG. 1 a printed circuit bridge initiator 10 according to the invention comprising a thin elongated base plate or substrate 12 made of electrically insulating or nonconducting material such as polyamide. Provided on the surface 14 of the substrate 10 is a printed circuit bridge 16 that may be made of metal such as copper, aluminum, tungsten or platinum. The printed circuit bridge 16 may be deposited on the substrate 12 using conventional printed circuit methods and includes input terminals 17 and 19 and spaced electrically conducting strips 18 and 20. A shaped bridge 22 in an initiating region 23 of the bridge 16 joins the distal ends of the strips 18 and 20. The input terminals 17 and 19 are suitably adapted in known manner for connection to a source of direct electrical current (not shown).

The shaped bridge 22 is in the form of two generally equilateral squares 22a and 22b, as seen in the drawing, that are positioned in contiguous relation with a corner portion of one square touching a corner portion of the other, thereby providing a necked down or narrowed portion between them, as shown.

A printed or painted explosive charge of pyrotechnic material 24 may be provided in association with the shaped bridge 22 in the ignition region 23.

A protrusion 25 provided on strip 18 provides a spark initiation site to protect against electrostatic discharges that otherwise might fire the initiator 10.

In FIG. 1 the initiator 10 is shown positioned in association with an air bag inflator 26. Inflator 26, which may be of the solid fuel type, includes a housing 27 having a wall 28 provided with outer orifices 29, and includes a base component 30 in which a slot 32 that extends into the interior of the inflator is formed, in which slot initiator 10 is positioned. By way of example only and not limitation, it is noted that the inflator 26 may be of the type illustrated in U.S. Pat. No. 4,943,086 issued on Jul. 24, 1990 to Donald J. Cunningham, which patent is assigned to the assignee of the present invention.

The printed circuit bridge initiator 10 heats up when the proper firing direct electrical current is passed through the bridge initiating region 23. The arrangement is such that it will not fire if the current is less than a specific magnitude or level, irrespective of the duration of the current flow. Once the initiating region 23 gets sufficiently hot, however, it ignites the printed or painted on explosive charge 24. The charge 24 ignites an initiator output charge (not shown in FIG. 1) which, in turn, ignites the solid fuel (not shown) within the air bag inflator 26.

The protrusion 25 on strip 18 provides the shortest distance between the printed circuit bridge 10 and a wall 34 of the slot 32 in the base component 30 of the inflator 26 to direct a spark such that the initiating region 23 is not damaged by the electrostatic discharge, nor operation of the inflator 26 initiated.

Figure 2:
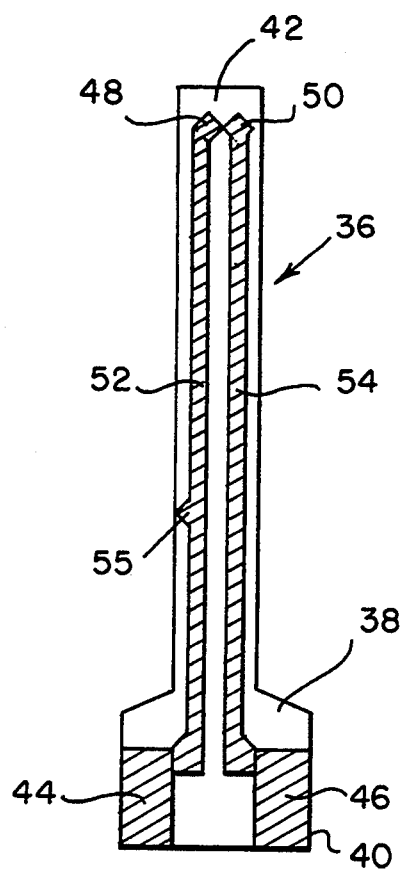
FIG. 2 is a front view, on a larger scale, of another embodiment of the printed circuit bridge according to the invention.

There is illustrated in FIG. 2 an elongated printed circuit bridge 36 that is formed on a plate or substrate 38 made of a material such as polyamide. At a first end 40 thereof the substrate 38 is substantially wider than at a second end 42 thereof. This allows the use at the end 40 of the substrate 38 of wider segments 44 and 46 of deposited metal for facilitating connection to a source of electrical current for activating the bridge 36. Provided at the other end 42 of the substrate 38 are two opposed segments 48 and 50 of deposited metal each of which segments are in the shape of a square and are disposed with respect to each other such that a pointed edge of one segment 48 is in touching, that is, electrical contacting relation with a pointed edge of the other segment 50, as shown.

Extending between the segments 44 and 46 at the first end 40 of the substrate 38 and the segments 48 and 50 at the second end 42 thereof are first and second strips 52 and 54, respectively, the strips 52 and 54 being spaced from each other. Each of the strips 52 and 54, as shown, is substantially narrower than the segments 44 and 46 and also the segments 48 and 50.

A protrusion 55 is provided at an intermediate position along one of the strips, for example, strip 52, as shown, to provide a spark initiation site and thereby guard against the deleterious effects of electrostatic discharges.

In FIG. 2 pyrotechnic material is not shown printed or painted on the surface of the substrate 38 in association with the segments 48 and 50 in the initiator region. It will be understood, however, that if so desired, pyrotechnic material may be so provided thereat.

In the embodiment of the invention illustrated in FIGS. 3 and 4, a printed circuit bridge 36 which may be similar to that illustrated in FIG. 2, is shown inserted through an opening 56 in the base component 58 of an inflator 60. The opening 56 includes a relatively large cutaway portion 62 adjacent the external surface of the inflator base component 58 and a narrow portion or slot 64 in an intermediate region of the base component 58, which slot 64 leads to an inner cavity 66 in the base component 58. The dimensions of the slot 64 in the side view as seen in FIG. 3 are just sufficient to allow the printed circuit bridge 36 to be inserted comfortably therethrough without scraping and damaging the bridge. Contained within the cavity 66, which is closed by a foil seal 68, is pyrotechnic material 70 in powder form which, for example, may be zirconium potassium perchlorate although other known pyrotechnic materials may also be employed.

Figure 5:
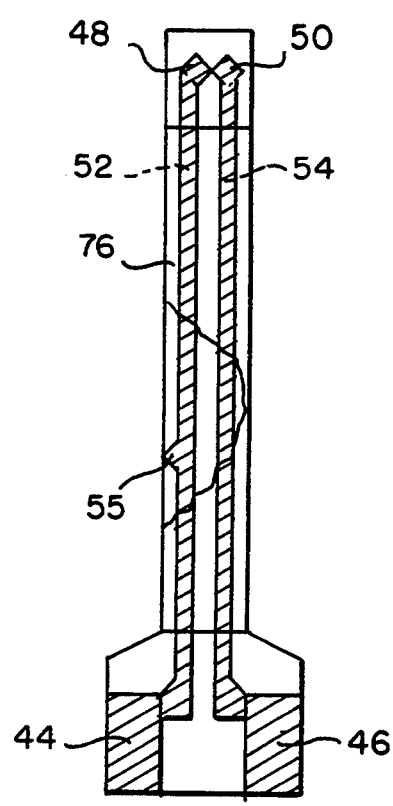
FIG. 5 is a fragmented view illustrating the use of an electrically nonconducting film bonded to the surface of a printed circuit bridge to encase and thereby preclude electrical contact with the wall of a slot in the base component of an inflator in which the bridge is to be inserted.

In order to guard against contact or grounding between the strips 52 and 54 of the printed circuit bridge 36 and the adjacent wall 72 of the inflator base component 58, an epoxy seal 74 may be placed between the wall 72 and the metal forming the strips 52 and 54 of the bridge 36. Such an epoxy seal 74 may be formed either on the surface of the wall 72 or on the surface of the substrate 38, the latter being shown in FIG. 4. In each case the bridge strips 52 and 54 are electrically insulated from the wall 72. Alternatively, a thin film 76 of electrically nonconductive material such as polyamide may be bonded to the surface of the printed circuit bridge 36 thereby encasing the strips 52 and 54 therein, as illustrated in FIG. 5.

In accordance with the invention, the relatively large cutaway portion 62 adjacent the external surface of the inflator base component 58 is closed by seal means 78 which may comprise epoxy or molded seal or any other suitable sealing means, with an enlargement 80 internally of the cutaway portion 62 being provided to ensure retention of the seal means 78 therein.

As best seen in FIG. 4, a pyrotechnic material 82 is provided on the printed circuit bridge, at the initiator region 84 thereof which is located at the second end 42 of the substrate 38, being printed or painted thereon. The pyrotechnic material may be composed of lead styphnate or any other suitable pyrotechnic material.

A coating 86 of Nichrome, an alloy of 60% nickel, 24% iron, 16% chromium and 0.1% carbon, as shown in FIG. 4, may be applied by conventional electrostatic and other appropriate means to the metallic elements forming the segments 48, 50, 52 and 54 of the printed circuit bridge to avoid interaction, that possibly could be deleterious, between such metallic elements and the pyrotechnic material with which those elements come into contact.

Protection against electrostatic effects is provided by a pair of protrusions 88 and 90 that are provided in association with the elongated leg 54 and extends to the edge of the substrate 38. It will be noted that the ends of the protrusions 88 and 90 remain exposed even though the thin film 76, as shown in FIG. 5, electrically insulates the legs 52 and 54 from the wall 72 of the slot 64 in the base component 58 of the inflator 60. Thus, the thin film 76 does not interfere with the protrusions 88 and 90 providing spark protection against extraneous electrostatic effects.

In accordance with the invention, adjustment of the relationship between the magnitude of the direct electrical current flow through the printed circuit bridge of each of the embodiments herein illustrated and disclosed and the duration of such current flow that is required to activate, that is, fire the initiator may be effected by varying the thickness and width of the substrate and also by trimming, that is, varying the thickness and shape of the bridge that is printed or deposited on the substrate. Such trimming may be effected by conventional laser means to get an accurate fire/no fire condition.

As those skilled in the art will understand, the printed circuit bridge provides the following advantages over initiators currently used for air bag inflators.

1. The ability to change the width and the thickness of the bridge and the shape of the bridge allows tuning of the improved initiator. The initiators known in the prior art allow only a change in the type employed and the diameter thereof whereby they have limited fire/no fire tuneability.

2. In the prior art initiators, the glass-to-metal seal headers that are employed require lapping operations to create a flat surface for bridge attachment. The bridge is spot welded in place. The printed bridge replaces this complicated and expensive operation with a simple printed or disposition and etch operation.

3. The printed circuit bridge could improve reliability due to its process simplicity.

Thus, there has been disclosed, in accordance with the invention, an improved initiator for an air bag inflator that may be fabricated by simpler methods of manufacture and is more adapted to being mass produced. The improved initiator is characterized in comprising an electrically conductive bridge that is deposited on an electrically nonconductive thin film plastic substrate of compact size in intimate contact therewith whereby the structure is resistant to damage tending to be caused by vibration, bending and handling. The improved initiator is further characterized in the ability to effect tuning thereof by adjustment of the width and/or thickness of the substrate and also the shape of the bridge. Another feature of the improved initiator is the requirement thereof for only a very small feed through slot into the interior of the inflator in consequence of which, if there should be a structural failure of the initiator, the slot will be plugged by the larger products of combustion produced in the inflator. Additionally, the inflator housing is strengthened because there is required only a slot of relatively small cross section for inserting the improved initiator into the interior of the inflator.

By way of illustration and not limitation, it is contemplated that the printed circuit bridge initiator illustrated in FIG. 2 may have dimensions indicated, as follows:

a thickness in the range of 0.002 to 0.020 inches;
length of about one (1) inch;
length of first end portion 40 of 0.180 inch;
width at first end portion 40 of 0.252 inch;
width at second end portion 42 of 0.110 inch;
width of each of segments 44 and 46 of 0.07 inch;
length of each of segments 44 and 46 of 0.130 inch;
distance from first end portion 40 to projection of 0.235 inch.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A printed circuit bridge initiator for an air bag inflator comprising, an elongated thin film electrically nonconducting plastic substrate, said substrate having a thickness, a width and a length, and a printed circuit bridge formed on said substrate comprising spaced electrically conducting strips extending for substantially the full length of the substrate, said strips being adapted for the connection thereto at one end thereof of a source of direct electrical current and having a bridge connected therebetween at the other end thereof, said bridge being printed on said substrate, wherein said substrate is formed of a polyamide, wherein said spaced electrically conducting strips are formed of metal, wherein tuning of said initiator, that is adjustment of the relationship between the magnitude of the direct electrical current flow through said initiator and the duration of such current flow required to activate said initiator, is effected by adjustment of the width and/or thickness of said substrate and the shape of said bridge, wherein the thickness of said substrate on which said printed circuit bridge is printed is in the range of 0.002 to 0.02 inches, the width of said substrate is about 0.110 inches, and the length of said substrate is about one inch, and wherein said bridge has the shape of two generally equilateral squares that are positioned in contiguous relation with a corner portion of one square touching a corner portion of the other square, thereby forming a necked down or narrowed portion between them.

2. A printed circuit bridge initiator for an air bag inflator as defined in claim 1 wherein said metal is copper.

3. A printed circuit bridge for an air bag inflator as defined in claim 1 wherein said metal is plated with an alloy of 60% nickel, 24% iron, 16% chromium and 0.1% carbon.

4. A printed circuit bridge initiator for an air bag inflator as defined in claim 1 wherein said metal is tungsten.

5. A printed circuit bridge initiator for an air bag inflator as defined in claim 1 wherein said metal is platinum.

6. An inflator for an air bag comprising a housing having a base component with a slot formed therein into the interior of said inflator, said slot having a wall, and including, a printed circuit bridge initiator for said inflator, a portion at least of said initiator being located in the interior of said inflator through said slot and comprising, an elongated thin film electrically nonconducting plastic substrate, said substrate having a thickness, a width and a length, and a printed circuit bridge formed on said substrate comprising spaced electrically conducting strips extending for substantially the full length of the substrate, said strips being adapted for the connection thereto at a first end thereof of a source of direct electrical current and having a bridge connected therebetween at a second end thereof, said bridge being printed on said substrate and forming part of the portion of said printed circuit bridge that is located in the interior of said inflator through said slot, wherein tuning of said initiator, that is, adjustment of the relationship between the magnitude of the direct electrical current flow through the initiator and the duration of such current flow required to activate said initiator, is effected by adjustment of the width and/or thickness of said substrate and the shape of said bridge, wherein said substrate is formed of a polyamide, wherein the thickness of said substrate is in the range of 0.002 to 0.02 inches, the width of said substrate is about 0.110 inch, and the length of said substrate is about one inch, wherein said bridge has the shape of two generally equilateral squares that are positioned in contiguous relation with a corner portion of one square touching a corner portion of the other square, thereby providing a necked down or narrowed portion between them, and wherein said spaced electrically conducting strips are formed of metal.

7. An inflator for an air bag as defined by claim 6 further including pyrotechnic material formed on said substrate at the said second end thereof adjacent to and in contact with said bridge.

8. An inflator for an air bag as defined by claim 7, further including a coating of an alloy of 60% nickel, 24% iron, chromium and 0.1% carbon, applied to said bridge and said spaced electrically conductive metal strips to avoid interaction that possibly could be deleterious between said bridge and said metal strips and said pyrotechnic material with which said bridge and said metal strips come into contact, and further including a coating of electrically nonconducting sealing means on the metal forming said metal strips.

9. An inflator for an air bag as defined by claim 8, wherein a cavity is formed in said base component of said inflator interiorly thereof, said cavity being in communication with said slot, and further including pyrotechnic material within said cavity.

10. An inflator for an air bag as defined by claim 9 wherein said bridge portion at least of said printed circuit bridge extends into said pyrotechnic material in said cavity in said base component of said inflator.

11. An inflator for an air bag as defined by claim 6, wherein the dimensions of said slot in said inflator housing are just sufficient to allow said printed bridge circuit initiator to be inserted comfortably therethrough without scraping and damaging said printed bridge circuit initiator, further including electrically nonconductive sealing means placed between the adjacent wall of said slot and said metal strips of said printed circuit bridge to guard against electrical contact or grounding between said metal strips and the base component of said housing.

12. An inflator as defined in claim 11 wherein said sealing means comprises an epoxy seal formed on the surface of the wall of said slot in said inflator housing.

13. An inflator as defined in claim 11 wherein said sealing means comprises an epoxy seal formed on the surface of said substrate on which said printed circuit bridge initiator is formed.

14. An inflator as defined in claim 11 wherein said sealing means comprises an electrically nonconductive polyamide bonded to the surface of said printed circuit bridge initiator and encasing said metal strips therein.

15. An initiator as defined by claim 11 further including, a pyrotechnic material provided on the printed circuit bridge initiator at the location of said bridge at the second end thereof, and a coating of an alloy of 60% nickel, 24% iron, chromium and 0.1% carbon applied to said bridge and said spaced electrically conductive metal strips to avoid interaction that possibly could be deleterious between said bridge and said metal strips and the pyrotechnic material with which said metal strips come into contact.

16. An inflator as defined by claim 15 wherein said pyrotechnic material provided on the printed circuit bridge initiator at the location of said bridge at the second end thereof is printed thereon.

17. An inflator as defined by claim 15, wherein said pyrotechnic material provided on the printed circuit bridge initiator at the location of said bridge at the second end thereof is painted thereon.

* * * * *

UNITED STATES PATENT AND TRADEMARK OFFICE
CERTIFICATE OF CORRECTION

PATENT NO. : 5,337,674
DATED : August 16, 1994
INVENTOR(S) : Harris et al

It is certified that error appears in the above-indentified patent and that said Letters Patent is hereby corrected as shown below:

Claim 8, column 7, line 49, insert --16%-- before "chromiumn".

Claim 15, column 8, line 41, insert --16%-- before "chromium".

Signed and Sealed this

First Day of November, 1994

Attest:

BRUCE LEHMAN

Attesting Officer

Commissioner of Patents and Trademarks